United States Patent
Fujii et al.

(10) Patent No.: US 8,880,297 B2
(45) Date of Patent: Nov. 4, 2014

(54) CONTROL DEVICE FOR VEHICLE SEAT

(75) Inventors: Yuki Fujii, Chiryu (JP); Toshiro Maeda, Anjo (JP); Hiroki Kino, Chita-gun (JP); Soichiro Hozumi, Nishio (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/820,826

(22) PCT Filed: Oct. 6, 2011

(86) PCT No.: PCT/JP2011/073086
§ 371 (c)(1), (2), (4) Date: Mar. 5, 2013

(87) PCT Pub. No.: WO2012/053369
PCT Pub. Date: Apr. 26, 2012

(65) Prior Publication Data
US 2013/0249266 A1 Sep. 26, 2013

(30) Foreign Application Priority Data
Oct. 21, 2010 (JP) .................................. 2010-236584

(51) Int. Cl.
*B60N 2/06* (2006.01)
*B60N 2/02* (2006.01)

(52) U.S. Cl.
CPC .............. *B60N 2/06* (2013.01); *B60N 2/0248* (2013.01); *B60N 2/0244* (2013.01)
USPC ......................................... 701/49; 297/344.1

(58) Field of Classification Search
USPC ............. 701/49, 45; 297/344.1, 217.3, 216.1
See application file for complete search history.

(56) References Cited

U.S. PATENT DOCUMENTS

2004/0036330 A1* 2/2004 Itami et al. ..................... 297/243
2006/0284587 A1* 12/2006 Teshima et al. ............... 318/567

FOREIGN PATENT DOCUMENTS

| JP | 6 55571 | 8/1988 |
|---|---|---|
| JP | 5 338482 | 12/1993 |
| JP | 9 123924 | 5/1997 |
| JP | 2007 168480 | 7/2007 |
| JP | 2007 196948 | 8/2007 |
| JP | 2010 23811 | 2/2010 |

OTHER PUBLICATIONS

"Toyota Crown Hybrid New Model Manual," Toyota Motor Corporation, Chapter 11, Total 3 pages, (Feb. 2008).
International Search Report Issued Dec. 13, 2011 in PCT/JP11/73086 Filed Oct. 6, 2011.

(Continued)

Primary Examiner — Marthe Marc-Coleman
(74) Attorney, Agent, or Firm — Oblon, Spivak, McClelland, Maier & Neustadt, L.L.P.

(57) ABSTRACT

A control device for a vehicle seat is provided. This control device for the vehicle seat is provided with a control unit. In order to improve the performance of getting into and out of a vehicle, the control unit executes an away movement for moving the vehicle seat to the rear of the vehicle when a preset away condition is satisfied, and when a preset return condition is satisfied in this state, executes a return movement for moving the vehicle seat to the front of the vehicle. The return condition includes, as a first return condition, a vehicle door being closed with a portable key in the vehicle.

5 Claims, 3 Drawing Sheets

(56) References Cited

OTHER PUBLICATIONS

International Preliminary Report on Patentability issued May 8, 2013, in PCT/JP2011/073086 (submitting English translation only).

Written Opinion of the International Search Authority issued Dec. 13, 2011, in PCT/JP2011/073086 (submitting English translation only).

* cited by examiner

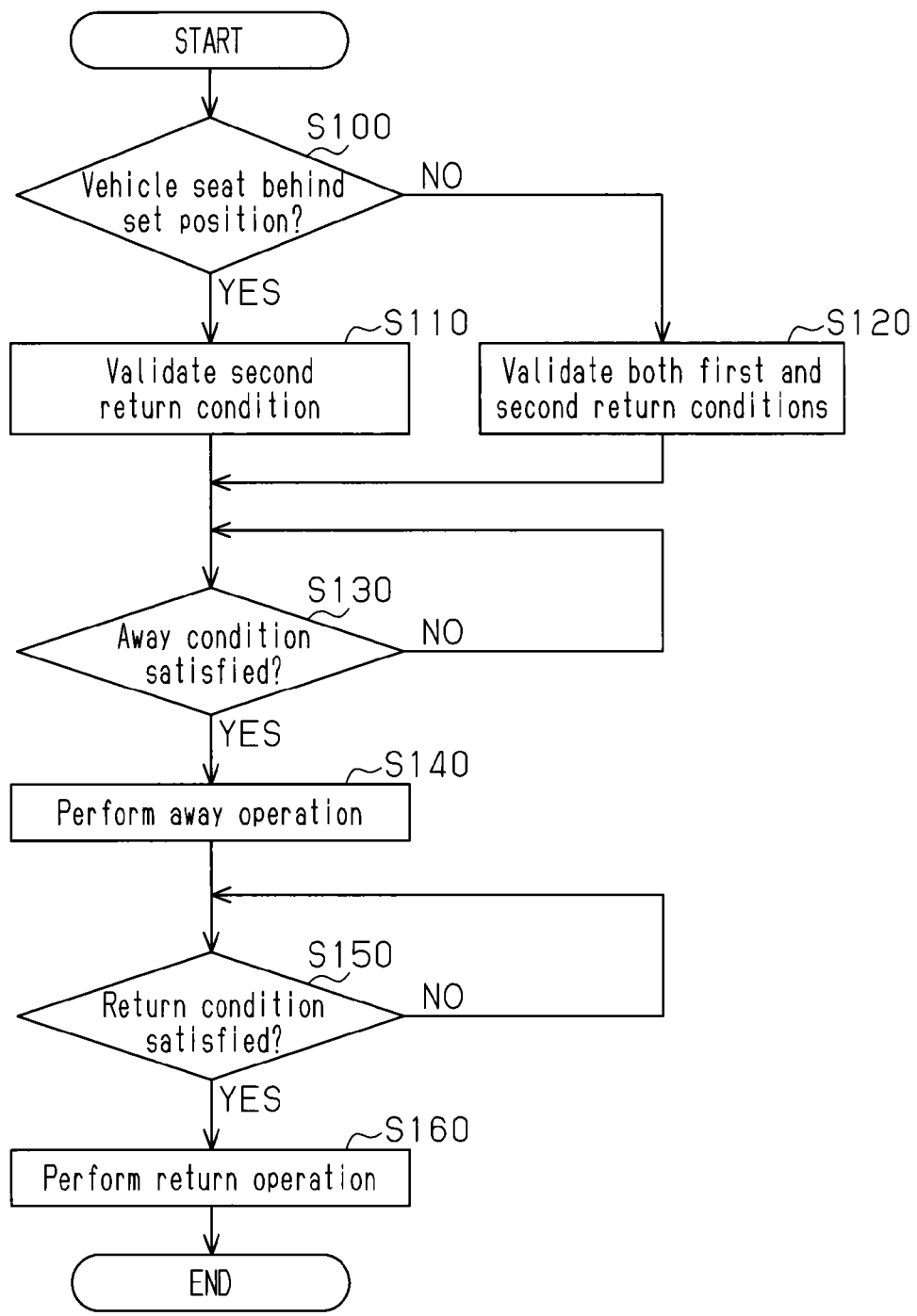

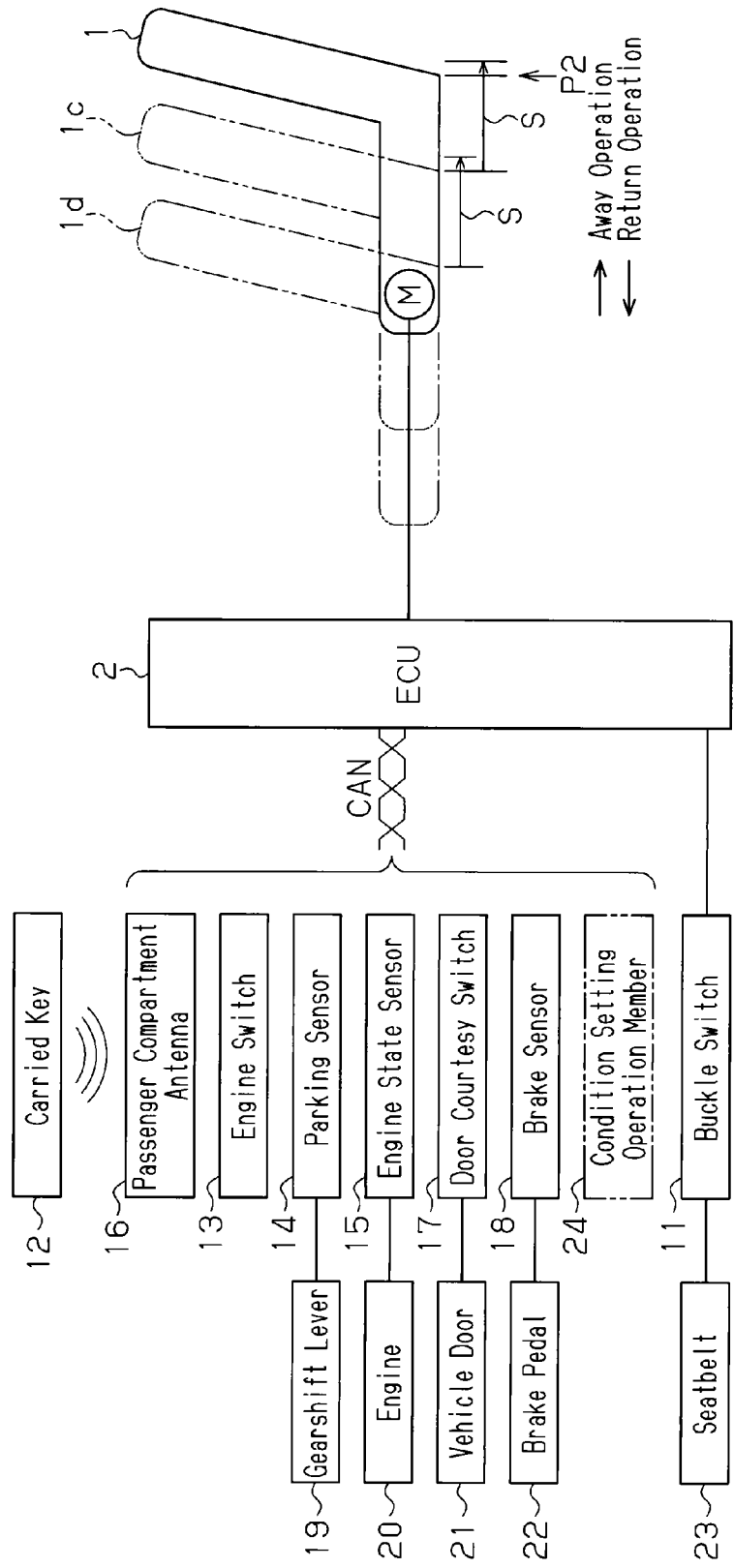

CONTROL DEVICE FOR VEHICLE SEAT

FIELD OF THE INVENTION

The present invention relates to a controller for a vehicle seat.

BACKGROUND OF THE INVENTION

A controller for a vehicle seat that controls the position of the vehicle seat in the front to rear direction of a vehicle is known in the prior art. For example, non-patent document 1 describes a controller for a vehicle seat that moves (away operation) the vehicle seat in the front to rear direction by, for instance, 100 mm if conditions (away conditions) such as the gearshift lever being at the parking position when the engine switch is deactivated and the seatbelt having been unfastened are satisfied. Thus, the driver does not have to perform a special operation when exiting a vehicle. The driver merely performs an operation that is usually performed before exiting the vehicle to move the vehicle seat in the front to rear direction of the vehicle and widen the space between the vehicle seat and the steering wheel or the like. This improves the vehicle exiting property (i.e., the easiness for the driver to exit the vehicle). Then, when a condition (return condition) such as the engine switch having been switched to the accessory mode, the engine having been started, or the seatbelt having been fastened to the buckle is satisfied, the controller of the vehicle seat moves (return operation) the vehicle seat toward the front of the vehicle, that is, to the position prior to the away operation. In this manner, a wide space remains between the vehicle seat and the steering wheel when the driver enters the vehicle. This improves the vehicle entering property (i.e., the easiness for the driver to enter the vehicle). Further, the driver does not have to perform a special operation after entering the vehicle and before starting to drive the vehicle. The driver merely performs an operation that is usually performed before starting to drive the vehicle to return the vehicle seat to the position (driving position) prior to the away operation so that the driver can smoothly start driving the vehicle.

PRIOR ART DOCUMENTS

Non-Patent Document 1: "TOYOTA CROWN HYBRID NEW MODEL MANUAL," TOYOTA MOTOR CORPORATION, February 2008, Chapter 11

SUMMARY OF THE INVENTION

There are drivers who are accustomed to starting the engine before fastening the seatbelt. In such a case, the driver may not be able to perform such an operation smoothly because operation members (e.g., brake pedal and engine switch) used to perform an operation for starting the engine (e.g., pushing the engine switch while depressing the brake pedal) are located at positions separated from the vehicle seat. In particular, when the engine starting operation includes the depression of the brake pedal, the stroke of the away operation (e.g., 100 mm) would have a relatively large effect on a driver who has a small build (i.e., driver has a shorter height than average). In other words, the legs of a driver having a small build would usually be shorter than average. Thus, it may be difficult for the driver to reach the brake pedal with his or her foot when seated on the vehicle seat. To cope with this, a small stroke may be preset for the away operation (e.g., 50 mm). However, in such a case, sufficient space cannot be obtained between the vehicle seat and the steering wheel or the like when the driver enters the vehicle. This would adversely affect the vehicle entering property. Further, the driver may first switch the engine switch to the accessory mode and then return the vehicle seat to the position prior to the away operation (driving position) before pushing the engine switch while depressing the brake pedal to start the engine. However, these operations are burdensome.

It is an object of the present invention to provide a controller for a vehicle seat that allows the driver to smoothly start driving.

To achieve the above object, one embodiment of the present invention provides a vehicle seat controller. The vehicle seat controller includes a control unit that performs an away operation, which moves a vehicle seat toward the rear of a vehicle when a preset away condition is satisfied to improve a vehicle entering property, and in this situation performs a return operation, which moves the vehicle seat toward the front of the vehicle when a preset return condition is satisfied. The return condition includes, as a first return condition, a vehicle door having been closed when a carried key is in the vehicle.

BRIEF DESCRIPTION OF THE DRAWINGS

FIG. 2 is a flowchart illustrating a process executed by the vehicle seat controller of FIG. 1.

FIG. 3 is a schematic diagram illustrating a vehicle seat controller in a further example.

DETAILED DESCRIPTIONS OF THE PREFERRED EMBODIMENTS

Figure 1:
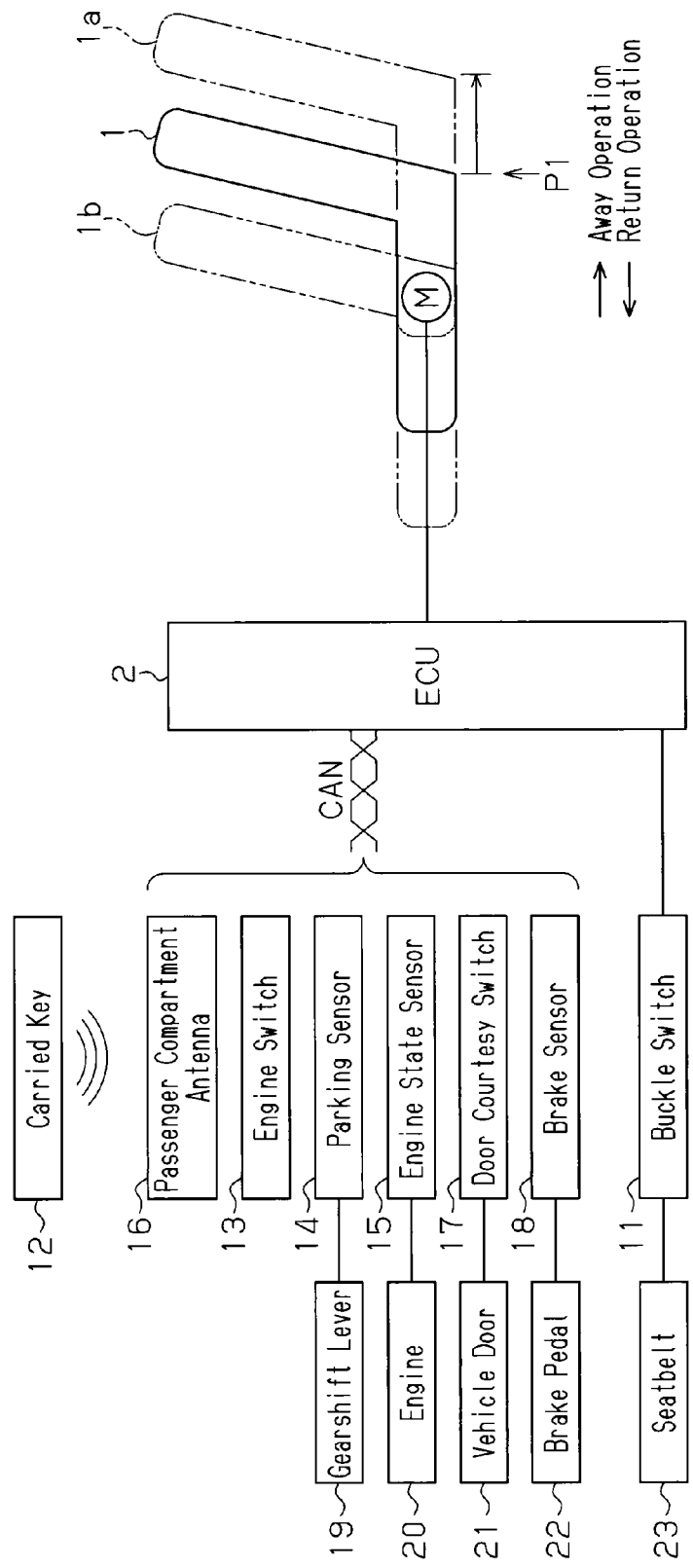
FIG. 1 is a schematic diagram illustrating a controller for a vehicle seat in one embodiment of the present invention.

One embodiment of the present invention will now be described with reference to FIG. 1. As shown in FIG. 1, a vehicle seat 1 (driver seat) includes a motor M and is movable, due to the drive force of the motor M, on the vehicle floor in the front to rear direction of the vehicle.

The vehicle seat 1 further includes an ECU 2, which serves as a control unit. The ECU 2 drives and controls the motor M based on various signals received through an in-vehicle network controller area network (CAN) from an upper rank ECU (not shown) and signals received from a buckle switch 11 that detects whether or not a seatbelt 23 of the vehicle seat 1 is fastened.

A vehicle that includes the vehicle seat 1 of the present embodiment employs the so-called smart entry intelligent key system that detects when a carried key 12 (smart key or electronic key) is located outside the vehicle in the proximity of the vehicle or inside the vehicle, and allows for the locking and unlocking of the vehicle doors, the switching to the accessory mode, the starting of the engine, and the like without using a mechanical key. An operation for switching the engine switch 13 to the accessory mode includes the driver pushing a push-button type engine switch 13, which is arranged beside the steering wheel, without depressing a brake pedal 22 (brake operation member), which is arranged below the steering wheel. Further, an operation for starting the engine 20 includes the driver pushing the engine switch 13 while depressing the brake pedal 22. Further, an operation for deactivating the engine switch 13 (operation for stopping the engine 20) includes pushing the engine switch 13 when the gearshift lever 19 in the parking position.

The various signals received from the upper rank ECU by the ECU 2 includes a signal based on a signal from a parking sensor 14, which detects whether or not the gearshift lever 19 is at the parking position, and a signal based on a signal from an engine state sensor 15, which detects whether or not the engine 20 has started. The various signals further include a signal based on a signal from a passenger compartment antenna 16, which detects whether or not the carried key 12 is in the vehicle, a signal based on a signal from a door courtesy switch 17, which detects whether or not the vehicle door 21 is closed, a signal based on a signal from a brake sensor 18, which detects whether or not the brake pedal 22 is depressed, and a signal based on a signal from the engine switch 13.

When away conditions, which are set in advance to improve the vehicle entering property, are satisfied, the ECU 2 performs an away operation that moves the vehicle seat 1 toward the rear of the vehicle by a preset stroke. In this situation, when return conditions, which are set in advance, are satisfied, the ECU 2 performs a return operation that moves the vehicle seat 1 toward the front of the vehicle, that is, toward the position prior to the away operation.

In detail, the away conditions are the gearshift lever 19 being at the parking position when the engine switch 13 has been deactivated and the seatbelt 23 being unfastened. The stroke of the vehicle seat 1 for the away operation is preset to 100 mm in the present embodiment.

The return conditions include first and second return conditions. The first return condition includes a vehicle door 21 being closed when the carried key 12 is in the vehicle. The second return condition includes at least one of: the engine switch 13 having been switched to the accessory mode, the engine 20 having been started, and the seatbelt 23 having been fastened. When the return condition is satisfied, the ECU 2 performs a return operation that moves the vehicle seat toward the front of the vehicle, that is, toward the position prior to the away operation.

In the present embodiment, when the vehicle seat 1, prior to the away operation, is located behind a set position P1 that is set in advance (refer to right vehicle seat 1a indicated by double-dashed lines in FIG. 1), the ECU 2 invalidates the first return condition and validates only the second return condition. When the vehicle seat 1 prior to the away operation is located at or in front of the set position P1 (refer to left vehicle seat 1b indicated by double-dashed lines in FIG. 1), the ECU 2 validates both of the first and second return conditions. The position information of the vehicle seat 1 is received by the ECU 2 from, for example, a pulse sensor (not shown) arranged in the motor M.

The process performed by the ECU 2 will now be described with reference to the flowchart of FIG. 2. First, the ECU 2 determines whether or not the vehicle seat prior to the away operation is located behind the set position (S100) to determine a return condition in accordance with the determination result (S110, S120). More specifically, when the vehicle seat 1 is located behind the set position P1 (S100: YES), the ECU 2 invalidates the first return condition and validates only the second return condition (S110). When the vehicle seat 1 prior to the away operation is located at or in front of the set position P1 (S100: NO), the ECU validates both of the first and second return conditions (S120).

In this situation, the ECU 2 determines whether or not the away conditions are satisfied (S130). For example, after the vehicle stops traveling, the away conditions are satisfied if the gearshift lever 19 has been moved to the parking position when the engine switch 13 is deactivated and the seatbelt 23 is unfastened. In this case, the ECU 2 performs an away operation that moves the vehicle seat 1 toward the rear of the vehicle by the preset stroke (100 mm in the present embodiment) (S140). Thus, the driver does not have to perform a special operation when exiting a vehicle. The driver merely performs operations that are often performed before exiting the vehicle to move the vehicle seat 1 to the rear of the vehicle and widen the space between the vehicle seat 1 and the steering wheel or the like. This improves the vehicle exiting property.

Subsequently, when the vehicle door 21 is closed with the carried key 12 located in the vehicle, the first return condition is satisfied. Here, when the vehicle seat 1, prior to the away operation, had been located behind the set position P1, only the second return condition is validated in step S110. Thus, the return operation is not performed. When the vehicle seat 1, prior to the away operation, had been located at or in front of the set position P1, the first and second return conditions are both validated in S110. Thus, a determination is given that the return condition is satisfied, and a return operation is performed to move the vehicle seat 1 toward the front of the vehicle (by 100 mm in the present embodiment) (S160).

The second return condition is satisfied when the engine switch 13 is switched to the accessory mode, the engine 20 is started, or the seatbelt 23 is fastened. Here, at least the second return condition had been satisfied in S110 or S120 regardless of where the vehicle seat 1, prior to the away operation, had been located relative to the set position. Thus, a determination is given that the return condition is satisfied, and a return operation is performed to move the vehicle seat 1 toward the front of the vehicle (by 100 mm in the present embodiment) (S160).

The space between the vehicle seat 1 and the steering wheel or the like remains wide when the driver enters the vehicle before the vehicle door 21 is closed. This improves the vehicle entering property. Thus, the driver does not have to perform a special operation after entering the vehicle from when closing the vehicle door 21 to when starting to drive the vehicle. The driver merely performs an operation that is often performed before starting driving to return the vehicle seat 1 to the position prior to the away position (i.e., driving position). This allows the driver to smoothly start driving.

The characteristic advantages of the above embodiment will now be described.

(1) The return conditions includes the first return condition, which is the vehicle door 21 having been closed when the carried key 12 is in the vehicle. Thus, the user carrying the carried key 12 merely sits on the vehicle seat 1 and closes the vehicle door 21 to move the vehicle seat 1 toward the front of the vehicle (i.e., toward the position prior to the away operation). This improves the vehicle entering property and allows the driver to smoothly start the engine 20 after the return operation (i.e., push the engine switch 13 while depressing the brake pedal 22) and smoothly start driving. When the carried key 12 is not in the vehicle, the return condition (first return condition) is not satisfied. Thus, after the user who is carrying the carried key 12 exits the vehicle, an unnecessary return operation is not performed. In the present embodiment, the present invention is embodied in the vehicle seat 1 of a vehicle that employs the so-called smart entry intelligent key system including the passenger compartment antenna 16, which detects whether or not the carried key 12 is in the vehicle, from the beginning. Thus, the above advantage may be obtained without any particular need for an additional sensor that detects whether or not the carried key 12 is in the vehicle.

(2) The return condition includes one of the engine switch 13 having been switched to the accessory mode, the engine 20 having been started, and the seatbelt 23 having been fastened, which are conventional return conditions, as the second condition. This allows a return operation similar to that of the prior art to be performed when, for example, the driver does not close the vehicle door 21.

(3) An operation for starting the engine 20, which is one second return condition, includes the depression of the brake pedal 22, that is, the operation of the brake operation member. When the position of the vehicle seat 1 prior to the away operation is behind the set position P1, which is set in advance, that is, when assumed that the driver has a large build (driver has a taller height than average), the ECU 2 invalidates the first return condition and validates only the second return condition. When the position of the vehicle seat 1 prior to the away operation is at or in front of the set position P1, that is, when assumed that the driver has a small build (driver has a shorter height than average), the ECU 2 validates the first return condition. The legs of a driver having a large build would usually be longer than average, and the stroke of the away operation (e.g., 100 mm) would have a relatively small effect. Thus, a driver having a large build would be able to reach the brake pedal in a relatively easy manner even when seated on the vehicle seat located at the position subsequent to an away operation. This allows the driver to smoothly depress the brake pedal 22 even before the return operation.

The above embodiment may be modified as described below.

In the above embodiment, the ECU 2 invalidates the first return condition and validates only the second return condition when the position of the vehicle seat 1 prior to the away operation is behind the set position P1, which is set in advance. However, there is no such limitation. For example, the ECU 2 may constantly validate the first and second return conditions.

Further, for example, in FIG. 3, which shows vehicle seats indicated by double-dashed lines, a right vehicle seat 1c shows where the vehicle seat 1 is located prior to the away operation. When the distance from the vehicle seat 1c to a rearmost position P2 of the movable range of the vehicle seat 1 is less than the preset stroke S of the away operation, the first return condition may be invalidated and the second return condition may be validated. For example, when the stroke S is set to 100 mm and the distance from the position of the vehicle seat prior to the away operation is less than 100 mm (such as 50 mm), the ECU 2 invalidates the first return condition and validates only the second return condition. In FIG. 3, which shows vehicle seats indicated by double-dashed lines, a left vehicle seat 1d shows where the vehicle seat 1 is located prior to the away operation. When the distance from the vehicle seat 1d to the rearmost position P2 is greater than or equal to the preset stroke S (e.g., 100 mm) of the away operation, the first and second return conditions are both validated. Apparently, the stroke S of this example (refer to FIG. 3) and the above embodiment (refer to FIG. 1) may be set to a value other than 100 mm.

In this case, when the movement amount of the away operation is the same as the preset stroke S (e.g., 100 mm) of the away operation, the return operation is performed when the first return condition is satisfied. This avoids a situation in which it is difficult for the driver to reach the brake pedal 22 with his or her foot when starting the engine 20. Thus, the driver can smoothly start driving. When the movement amount of the away operation is less than the preset stroke S (e.g., 100 mm) of the away operation, there is particularly no need for the return operation based on the first return condition. Thus, the ECU 2 validates only the second return condition, which is a conventional return condition. In this case, the driver can reach the brake pedal with his or her foot in a relatively simple manner even from a position taken subsequent to the away operation (i.e., rearmost position P2). Thus, the driver can smoothly depress the brake pedal 22 even if it is before the return operation.

As shown by the double-dashed lines in FIG. 3, the vehicle may include a condition setting operation member 24 that allows for the driver to invalidate the first return condition and validate only the second return condition. For example, a switch or the like may be arranged as the condition setting operation member on the vehicle seat 1, the vehicle door 21, in the proximity of the steering wheel, or on the carried key 12. The screen (touch panel or the like) of a car navigation may also function as the condition setting operation member 24. In this case, the driver may set (customize) the control of the vehicle seat 1 in any manner so that the return operation of the vehicle seat 1 is not performed when the driver who is holding the carried key 12 just sits on the vehicle seat 1 and closes the vehicle door 21. In addition to this or in lieu of this, the driver may separately invalidate the conditions of the second condition (the engine switch 13 having been switched to the accessory mode, the engine 20 having been started, and the seatbelt 23 having been fastened). For example, the driver may invalidate the second return condition and validate only the first return condition. Further, the away condition and second return condition may be changed, and other conditions may be added.

In the above embodiment, the vehicle includes the so-called smart entry intelligent key system that includes the passenger compartment antenna 16, which detects whether or not the carried key 12 is in the vehicle. However, there is no such limitation, and the passenger compartment antenna 16 may be dedicated for the determination of the return condition (first return condition).

The invention claimed is:

1. A vehicle seat controller comprising:
    a control unit that performs an away operation, which moves a vehicle seat toward the rear of a vehicle when a preset away condition is satisfied to improve a vehicle entering property, and performs a return operation, which moves the vehicle seat toward the front of the vehicle when a preset return condition is satisfied,
    wherein the return condition includes, as a first return condition, a vehicle door having been closed when a carried key is in the vehicle,
    the return condition includes, as a second return condition, at least one of an engine switch having been switched to an accessory mode, an engine having been started, and a seatbelt having been fastened,
    an operation for starting the engine includes operating a brake operation member, and
    the control unit invalidates the first return condition and validates only the second return condition when the position of the vehicle seat prior to the away operation is located behind a set position that is set in advance.

2. The vehicle seat controller according to claim 1, wherein the control unit moves the vehicle seat toward the rear of the vehicle by a preset stroke in the away operation,
    an operation for starting the engine includes operating a brake operation member, and
    the control unit invalidates the first return condition and validates only the second return condition when a distance from the position of the vehicle seat prior to the away operation to a rearmost position in a movable range of the vehicle seat is less than the preset stroke.

3. The vehicle seat controller according to claim 2, further comprising a condition setting operation member that invalidates the first return condition and validates only the second return condition.

4. A vehicle seat controller comprising:
a control unit that performs an away operation, which moves a vehicle seat toward the rear of a vehicle when a preset away condition is satisfied to improve a vehicle entering property, and performs a return operation, which moves the vehicle seat toward the front of the vehicle when a preset return condition is satisfied,
wherein the return condition includes, as a first return condition, a vehicle door having been closed when a carried key is in the vehicle,
the return condition includes, as a second return condition, at least one of an engine switch having been switched to an accessory mode, an engine having been started, and a seatbelt having been fastened,
an operation for starting the engine includes operating a brake operation member, and
the control unit validates both of the first and second return conditions when the position of the vehicle seat prior to the away operation is located at or in front of a set position that is set in advance.

5. A vehicle seat controller comprising:
a control unit that performs an away operation, which moves a vehicle seat toward the rear of a vehicle when a preset away condition is satisfied to improve a vehicle entering property, and performs a return operation, which moves the vehicle seat toward the front of the vehicle when a preset return condition is satisfied,
wherein the return condition includes, as a first return condition, a vehicle door having been closed when a carried key is in the vehicle,
the return condition includes, as a second return condition, at least one of an engine switch having been switched to an accessory mode, an engine having been started, and a seatbelt having been fastened,
an operation for starting the engine includes operating a brake operation member,
the control unit moves the vehicle seat toward the rear of the vehicle by a preset stroke in the away operation, and
the control unit validates both of the first and second return conditions when a distance from the position of the vehicle seat prior to the away operation to a rearmost position in a movable range of the vehicle seat is greater than or equal to the preset stroke.

* * * * *